United States Patent [19]

Germann

[11] 4,333,223

[45] Jun. 8, 1982

[54] SHIELDING CYLINDER AND METHOD OF MANUFACTURE

[75] Inventor: Willy Germann, Wurenlos, Switzerland

[73] Assignee: BBC Brown, Boveri & Company, Ltd., Baden, Switzerland

[21] Appl. No.: 136,349

[22] Filed: Apr. 1, 1980

Related U.S. Application Data

[62] Division of Ser. No. 5,915, Jan. 23, 1979, abandoned.

[30] Foreign Application Priority Data

Jan. 25, 1978 [CH] Switzerland ................... 788/78

[51] Int. Cl.³ .................................... B23P 11/02
[52] U.S. Cl. ................................ 29/447; 29/157.3 R; 29/455 R; 29/596; 310/52; 138/114
[58] Field of Search ............. 29/447, 455 R, 157.3 R, 29/596, 445; 310/52, 10, 40 R; 138/114

[56] References Cited

U.S. PATENT DOCUMENTS

| 2,302,229 | 11/1942 | Lampton | 29/447 UX |
| 2,386,747 | 10/1945 | Ris | 29/447 UX |
| 2,686,091 | 8/1954 | Young | 29/447 UX |
| 2,752,668 | 7/1956 | Sheen | 29/447 X |
| 3,040,846 | 6/1962 | Abberly | 29/447 X |
| 3,681,628 | 8/1972 | Krastchew | 310/52 X |
| 3,892,114 | 7/1975 | Taniguchi et al. | 29/447 X |
| 4,085,343 | 4/1978 | Hasegawa et al. | 310/52 |

Primary Examiner—Charlie T. Moon
Attorney, Agent, or Firm—Burns, Doane, Swecker & Mathis

[57] ABSTRACT

A shielding cylinder includes an inner cylinder and an outer cylinder of sheet metal. Axial ducts and annular ducts are arranged between the two cylinders to provide flow paths for a cooling fluid. The outer cylinder can be reinforced by one or more peripheral bulges with the bulges forming additional ducts. The shielding cylinder is manufactured by placing a heated inner cylinder onto a mandrel. The inner cylinder is then machined after cooling operation. A heated outer cylinder is then pushed onto the inner cylinder and the outer cylinder is then cooled and machined. A two piece mandrel facilitates the manufacture of long shielding cylinders.

6 Claims, 1 Drawing Figure

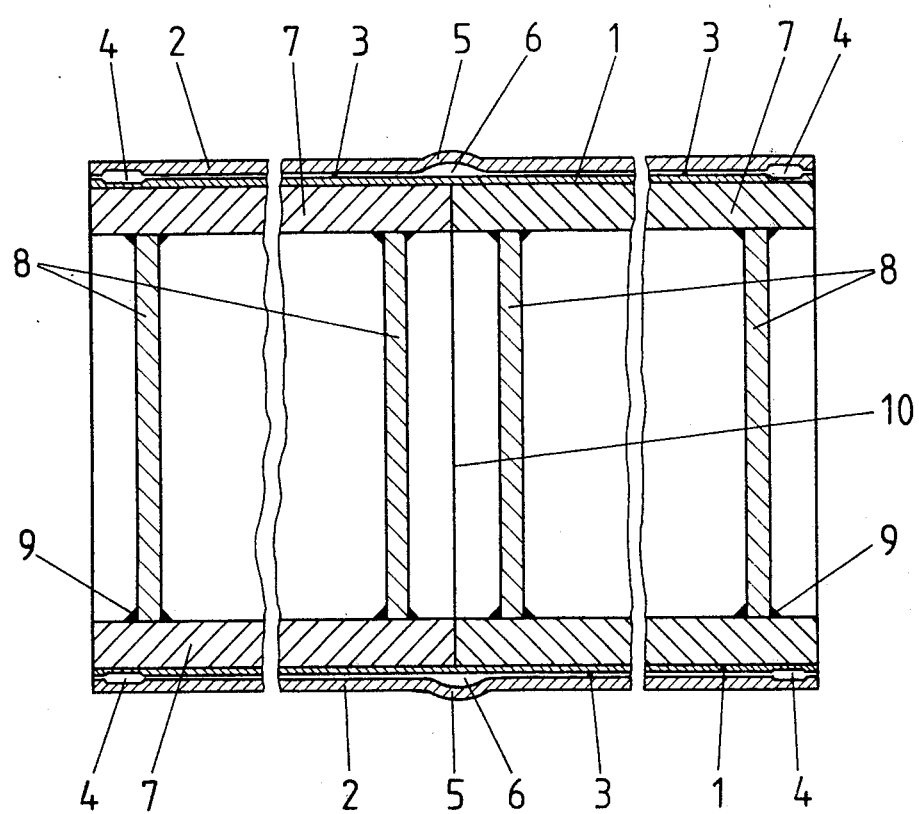

SHIELDING CYLINDER AND METHOD OF MANUFACTURE

This is a division of application Ser. No. 5,915, filed Jan. 23, 1979, now abandoned.

BACKGROUND AND SUMMARY OF THE PRESENT INVENTION

The present invention relates generally to shielding cylinders for electrical machines and more specifically relates to a shielding cylinder for an electrical machine having a superconductive excitation winding and a method for manufacture of the cylinder.

A turbogenerator having a superconductive excitation winding is disclosed and illustrated in longitudinal cross section in the article "Turbogeneratoren mit supraleitender Erregerwicklung" in Bull. SEV 64 (1973), 17, 18 August, pages 1040 to 1050 (see especially page 1043, FIG. 3). The excitation winding is cooled by liquid helium. A cold rotor body, which supports the excitation winding, is arranged within an outer, warm cylinder, with a high vacuum generated in the interspace between the cylinders. Fastening of the inner rotor body and a transfer of torque to the shaft ends (which are at room temperature) is accomplished by thin fittings which are cooled with helium. In the interspace between the cylinders under vacuum, a thin cylinder, a "Strahlungszylinder" is provided which acts as an additional electrothermal shield. The thin cylinder absorbs the heat radiated by the outer cylinder and reduces a residual amount of the magnetic fields which permeate the outer damping cylinder to a magnitude which can be tolerated by the superconductor. The manufacture of such shielding cylinder is rather complicated, however, in view of the large dimensions of such cylinder. The cylinder may have a length amounting for example to 10 meters.

It is a primary object of the present invention to provide a shielding cylinder for an electrical machine with superconductive excitation winding which cylinder has very precise circular and cylindrical dimensions. If the dimensions are not precise, the danger of a breakdown otherwise exists.

It is a further object of the present invention to provide a method of simple construction of the cylinder.

It is an advantage of the present invention to permit a precise working and machining of the shielding cylinder during manufacture. In this way, correct and proper dimensions of the cylinder may be ensured.

Advantageous further developments of the present invention include a simple and economical manufacture of the cooling ducts. An arrangement of annular ducts serves as collecting ducts. The annular ducts are arranged within portions of the outer surface of the inner cylinder as well as within a corresponding section of the inner surface of the outer cylinder. Such an arrangement results in a sufficiently large cross section for these ducts. One or more bulges may form annular ducts and will serve at the same time as mechanical reinforcements of the shielding cylinder. The bulges can also serve as the annular collecting ducts.

The shielding cylinder is manufactured most advantageously by placing a heated inner cylindrical member upon a mandrel. A mechanical treatment which then follows ensures the proper and correct dimensions of the inner cylinder, with axial and annular ducts being arranged in the shielding cylinder in a simple manner. An outer cylindrical member is heated and then pushed onto the inner cylinder. Machining of the outer cylindrical member then follows and gives the shielding cylinder its final shape.

A two piece mandrel makes possible a simple method of manufacture, even for very long and thin shielding cylinders.

BRIEF DESCRIPTION OF THE DRAWING

A preferred embodiment of the present invention is described with reference to a simple accompanying FIGURE wherein like members bear like reference numerals. The single FIGURE is a cross sectional view of a shielding cylinder according to the present invention.

DETAILED DESCRIPTION OF THE PRESENT INVENTION

With reference to the single FIGURE, an inner cylinder 1 of sheet metal is connected to an outer cylinder 2 also of sheet metal. A plurality of axial cooling ducts 3 extend within the areas of junction between the two cylinders 1 and 2. One or more annular collecting ducts 4 run in a peripheral direction around the inner cylinder. A bulge 5 is peripherally arranged in the outer cylinder 2 with the bulge forming an annular duct 6.

A mandrel 7 which consists of several parts is strengthened by a plurality of reinforcing disks 8 which are connected with the mandrel by welded joints 9. A line of separation between the parts of the mandrel 7 is denoted by numeral 10.

The shielding cylinder is manufactured by urging a heated inner cylinder 1 of sheet metal onto the mandrel 7. The mandrel 7 consists of several parts 7 so that it becomes possible to manufacture shielding cylinders of great length. The inner cylinder is shrunk onto the mandrels. The outer surface of the inner cylinder 1 is processed mechanically or machined after the shrink-on operation and proper outer dimensions for the inner cylinder are thereby obtained. The one or more axially running ducts 3 are formed by axial depressions within the outer surface of the inner cylinder 1. The annular ducts 4 are similarly formed by depressions within the inner surface of the outer cylinder 2.

The manufacture of the cylinder is relatively simple because the annular ducts 4 are located only near the ends of the shielding cylinder.

One or more bulges 5 are then formed which provide the annular ducts 6. The ducts 6 serve also as thermally equalizing ducts for the axial ducts.

The outer cylinder 2 is then heated so that its diameter will increase as a result of the heating. The outer cylinder is then pushed onto the inner cylinder 1. The axial ducts 3 together with the annular ducts 4 and the ducts 6 inside the bulges 5, together form a network for the cooling medium. The shielding cylinder including the cylinders 1, 2 is stretched during cooling far beyond the elastic limit of the cylinders and is thereby fitted to the shape of the mandrel 7. The cylinders in this way attain a sufficiently accurate round form. Variations in thickness of the sheet metals, from which the cylinders 1 and 2 are formed, are eliminated by machining of the cylinders 1 and 2, shrunk onto the mandrel 7.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the present invention.

What is claimed is:

1. A method for manufacturing a shielding cylinder for an electrical machine having a superconductive excitation winding, the method comprising the steps of:
   heat-shrinking an inner cylindrical member onto a mandrel;
   machining an outer surface of the inner cylindrical member wherein axial ducts are machined into the outer surface of the inner cylindrical member;
   machining an inner surface of an outer cylindrical member to provide at least one peripheral duct; and
   heat-shrinking the outer cylindrical member onto the inner cylindrical member thereby forming cooling ducts within the shielding cylinder.

2. The method of claim 1 further comprising the step of machining peripheral ducts into the outer surface of the inner cylindrical member.

3. The method of claim 1 further comprising the step of:
   providing at least one peripheral bulge in the outer cylindrical member.

4. A method for manufacturing a shielding cylinder for an electrical machine with a super-conductive excitation winding, wherein the shielding cylinder is arranged between the super-conductive excitation winding and a damping cylinder surrounding a rotor, comprising:
   shrinking a first metallic cylindrical member onto a mandrel;
   machining an outer surface of said first cylindrical member to obtain a desired diameter for said first cylindrical member;
   machining a plurality of axial ducts into said outer surface of said first cylindrical member;
   machining at least one peripheral duct into an inner surface of a second cylindrical member;
   heating said second cylindrical member and urging said second cylindrical member onto said first cylindrical member; and
   machining an outer surface of said second cylindrical member after it has cooled.

5. The method of claim 4 further comprising the step of:
   providing at least one peripheral bulge in said second cylindrical member.

6. The method of claims 1 or 4 further comprising the step of
   stretching the two cylindrical members beyond their elastic limit while each is cooling on the mandrel to fit the two cylindrical members to the shape of the mandrel.

* * * * *